US009604616B2

(12) United States Patent
Weiberle et al.

(10) Patent No.: US 9,604,616 B2
(45) Date of Patent: Mar. 28, 2017

(54) BRAKE BOOSTER FOR A VEHICLE AND METHOD FOR OPERATING A BRAKE BOOSTER OF A VEHICLE (71) Applicants: Reinhard Weiberle, Vaihingen/Enz (DE); Matthias Kistner, Bretzfeld (DE)

(72) Inventors: Reinhard Weiberle, Vaihingen/Enz (DE); Matthias Kistner, Bretzfeld (DE)

(73) Assignee: ROBERT BOSCH GMBH, Stuttgart (DE)

( * ) Notice: Subject to any disclaimer, the term of this patent is extended or adjusted under 35 U.S.C. 154(b) by 149 days.

(21) Appl. No.: 14/378,272

(22) PCT Filed: Dec. 17, 2012

(86) PCT No.: PCT/EP2012/075725
§ 371 (c)(1),
(2) Date: Aug. 12, 2014

(87) PCT Pub. No.: WO2013/120562
PCT Pub. Date: Aug. 22, 2013

(65) Prior Publication Data
US 2015/0034438 A1    Feb. 5, 2015

(30) Foreign Application Priority Data

Feb. 14, 2012  (DE) ........................ 10 2012 202 201

(51) Int. Cl.
*B60T 13/14*     (2006.01)
*B60T 7/04*      (2006.01)
(Continued)

(52) U.S. Cl.
CPC ............ *B60T 13/142* (2013.01); *B60T 7/042* (2013.01); *B60T 8/38* (2013.01); *B60T 11/203* (2013.01); *B60T 13/588* (2013.01); *B60T 13/745* (2013.01)

(58) Field of Classification Search
CPC .... B60T 13/142; B60T 13/588; B60T 13/745; B60T 7/042; B60T 8/38; B60T 11/203
See application file for complete search history.

(56) References Cited

U.S. PATENT DOCUMENTS 9,061,673 B2 *  6/2015  Weiberle .............. B60T 7/042
2006/0186733 A1 *  8/2006  Drumm ................ B60T 7/042
                                                          303/114.1
(Continued)

FOREIGN PATENT DOCUMENTS

CN       102211573 A    10/2011
DE    102007016861 A1   10/2008
(Continued)

*Primary Examiner* — Vishal Sahni
(74) *Attorney, Agent, or Firm* — Gerard Messina (57) ABSTRACT A brake booster and related method for its operation for a vehicle, having a master brake cylinder having a first primary piston chamber that is variable using an adjustable first primary piston component, a braking force transmission component, using which at least one driver braking force is transmittable by the adjustable first primary piston component contacted by the braking force transmission component, and an adjustable second primary piston component, the master brake cylinder having a second primary piston chamber that is variable using the adjustable second primary piston component, and the brake booster has a booster force transmission component, using which a booster force from the actuator device is transmittable at least partially to the adjustable second primary piston component contacted by the booster force transmission component, and the braking force transmission component in its force-free initial position is distanced by a first free play from the first primary piston component and/or the booster force transmission component, in its force-free initial position, is distanced by a second free play from the second primary piston component.

12 Claims, 4 Drawing Sheets (51) Int. Cl.
*B60T 11/20* (2006.01)
*B60T 13/58* (2006.01)
*B60T 13/74* (2006.01)
*B60T 8/38* (2006.01)

(56) References Cited

U.S. PATENT DOCUMENTS

| | | | | |
|---|---|---|---|---|
| 2013/0076114 A1* | 3/2013 | Fukushima | ............... | B60T 1/10 303/6.01 |
| 2013/0181506 A1* | 7/2013 | Weiberle | ................ | B60T 7/042 303/3 |
| 2013/0263588 A1* | 10/2013 | Yoshimoto | .............. | F15B 15/08 60/545 |
| 2014/0325973 A1* | 11/2014 | Mayer | .................. | B60T 13/745 60/327 |

FOREIGN PATENT DOCUMENTS

| | | |
|---|---|---|
| DE | 10 2009 055117 | 6/2011 |
| DE | 10 2010 038555 | 2/2012 |
| JP | 2007230419 A | 9/2007 |
| WO | 2012013391 A1 | 2/2012 |

* cited by examiner

BRAKE BOOSTER FOR A VEHICLE AND METHOD FOR OPERATING A BRAKE BOOSTER OF A VEHICLE

FIELD OF THE INVENTION

The present invention relates to a brake booster for a vehicle. Furthermore, the present invention relates to a method for operating a brake booster for a vehicle.

BACKGROUND INFORMATION

German document DE 10 2009 055 117 A1 discusses a master brake cylinder for an hydraulic vehicle brake system and a method for its operation. The master brake cylinder has a rod piston that may be designated as first piston and a tube-shaped second piston. The first piston is able to be displaced by a specifiable piston stroke through the second piston into a first pressure chamber of the master brake cylinder. A driving device developed on the second piston is supposed to have the effect that the first piston takes along the second piston after overcoming the predefined piston stroke. After overcoming the predefined piston stroke, the first piston and the second piston are supposed to be able to act in common upon the first pressure chamber of the master brake cylinder. In addition, using a floating piston, a second pressure chamber of the master brake cylinder is supposed to be able to be acted upon.

SUMMARY OF THE INVENTION

The present invention creates a brake booster for a vehicle having the features described herein, a braking system having the features described herein, a method for operating a brake booster of a vehicle having the features described herein and a method for operating a brake booster of a vehicle having the features of described herein.

Because of the advantageous development of free play between the force-free initial position of the braking force transmission component and the first primary piston component, the effect of a driver braking force exerted on the brake operating element/brake pedal may be reduced/eliminated. One may also circumscribe this by saying that in spite of the driver braking force exerted on the brake operating element, the driver's action of braking into the master brake cylinder is able to be reduced/prevented in a simple way. In a like manner, because of a second free play between the booster force transmission component and the second primary piston component, it is possible to prevent a booster force exerted on the booster force transmission component from automatically effecting a braking action into the master brake cylinder. In addition, a braking effect of the booster force, exerted on the booster force transmission component, using the actuator device, may be reduced by the development of the second free play.

The advantages described in the above paragraph of the first free play and/or of the second free play may be utilized for a multiplicity of utilization possibilities of the brake booster. Examples of this will be given in subsequent places in the text.

For example, the braking force transmission component present in its force-free initial position may be at a distanced by the first free play, unequal to zero, from the first primary piston component, which is greater than a distance between the booster force transmission component present in its force-free initial position and the second primary piston component. The distance between the booster force transmission component in its force-free initial position and the second primary piston component may be equal to zero or unequal to zero. Consequently, even before a direct braking on the part of the driver into the master brake cylinder, an admission pressure may be built up at least in the first primary piston chamber. As will be stated more precisely below, thus, even before the driver brakes into the master brake cylinder, an air gap is able to be closed.

Alternatively, the booster force transmission component present in its force-free initial position may be at a distanced by the second free play, unequal to zero, from the second primary piston component, which is greater than a distance between the braking force transmission component present in its force-free initial position and the first primary piston component. The distance between the braking force transmission component in its force-free initial position and the first primary piston component may, in this case, be equal to zero or unequal to zero. In both cases, an artificially extended free play between the booster force transmission component present in its force-free initial position and the second primary piston component may be developed, which may be used for a recuperation, without this being connected to an exceeding of a setpoint deceleration of the vehicle specified by the driver.

In one advantageous refinement, the brake booster may have a fluid exchange device, via which, when the fluid exchange device is present in a first operating mode, a fluid is exchangeable between the first primary piston chamber and the second primary piston chamber, and via which, when the fluid exchange device is present in a second operating mode, a fluid exchange between the first primary piston chamber and the second primary piston chamber is prevented. Thus the primary brake-in volume of the master brake cylinder is able to be varied by the switching/actuating of the fluid exchange device. For example, it may be established, by the switching/controlling of the fluid exchange device into the first operating mode, that the driver and the actuator device are able to brake into an overall primary piston chamber from the first primary piston chamber and from the second primary piston chamber using a greater overall volume. In contrast to that, it may be established, by a switching/controlling of the fluid exchange device into the second operating mode, that only the driver is able to brake in to the first primary piston chamber, that is, in a primary braking volume with only the first volume of the primary piston chamber. The switching/control of the fluid exchange device into the second operating mode is particularly advantageous in a mechanical fall-back plane, that is, in response to a failure/functioning impairment of the actuator device.

In addition, the master brake cylinder may also have a secondary piston chamber and a secondary piston that is able to be adjusted between the first primary piston chamber and the secondary piston chamber. Thus, the advantages of the present invention are also applicable to a tandem master brake cylinder.

In one advantageous refinement, in which at least the braking force transmission component, in its force-free initial position, is at a distance of the first free play unequal to zero from the first primary piston component, which is closable only as of a minimum driver braking force, the brake booster is able to have an actuator-control device using which the actuator device is able to be actuated in such a way that, at a driver braking force less than the minimum driver braking force, a specified setpoint booster force is able to be exerted, using the actuated actuator device, in such a way on the second primary piston component, that the second volume of the second primary piston chamber is reducible using the adjusted second primary piston chamber, and a fluid transfer from the second primary piston chamber into at least one wheel brake cylinder to build up an admission pressure in the at least one wheel brake cylinder is able to be triggered. In this way one is able to ensure that even before a direct braking of the driver into the master brake cylinder, an advantageous admission pressure is present in the at least one wheel brake cylinder.

The actuator-control device may, for instance, also be configured to specify the setpoint booster force while taking into account at least one state of a braking system component and/or a traffic situation. Consequently, in one state of the braking system component and/or in a traffic situation in which rapid braking of the vehicle seems to be advantageous, even before a direct braking of the driver into the master brake cylinder, an admission pressure is built up in the at least one wheel brake cylinder.

In addition, the setpoint booster force may be specified, or be specifiable, using the actuator-control device, in such a way that an air gap between at least one residual torque-free brake caliper and a brake disk is able to be closed using the built-up admission pressure. Whereas, conventionally, many drivers would refuse the provision of their braking system with at least one residual torque-free brake caliper, in spite of the reduced fuel consumption connected therewith, since the closing of the air gap between the at least one residual torque-free brake caliper and the brake disk cooperating with it, in the related art, leads to an elongated brake operating path, in the advantageous specific embodiment described in this instance, the air gap between the at least one residual torque-free brake caliper and the brake disk cooperating with it may be closed in a simple manner using the built-up admission pressure. This leads to a clearly improved braking comfort for the driver.

In a further refinement, in which at least the booster force transmission component present in its force-free embodiment is distanced from the second primary piston component by the second free play that is unequal to zero, which is able to be closed only as of a minimum booster force, the brake booster may have a generator control device, which, at least at a booster force less than the minimum booster force, is configured to actuate a generator in such a way that, using the generator, a generator braking torque unequal to zero is able to be exerted. The braking effect of the booster force prevented by the second free play is thus able to be utilized for the more rapid charging of a vehicle battery.

The advantages described in the above paragraphs are also able to be implemented using a braking system having a corresponding brake booster.

In particular, the braking system may have at least one residual torque-free brake caliper. Since, by using the build-up of an admission pressure even before the direct braking of the driver using the driver braking force, the air gap between the at least one brake caliper and the brake disk cooperating with it is already able to be closed, the braking system is able to combine the advantages of a good operating comfort with a reduced fuel consumption and a slight emission of pollutants.

The advantages mentioned above are also able to be put into effect by carrying out a corresponding method for operating a brake booster of a vehicle.

Additional features and advantages of the present invention are elucidated below, with reference to the figures.

DETAILED DESCRIPTION

Figure 1:
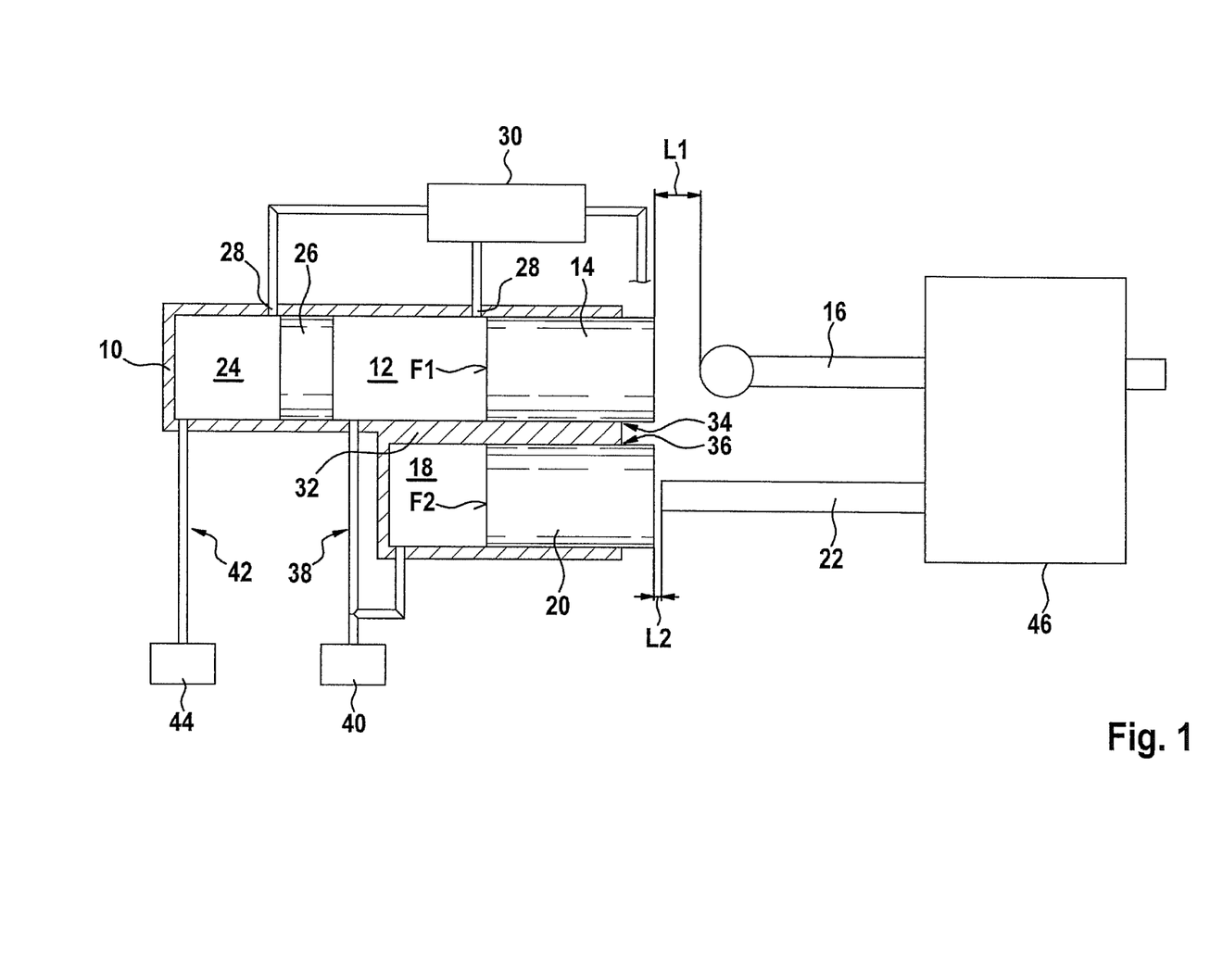
FIG. 1 shows a schematic representation of a first specific embodiment of the brake booster.

FIG. 1 shows a schematic illustration of a first specific development of the brake booster.

The brake booster shown schematically in FIG. 1 is able to be used in a vehicle, which may be in a vehicle equipped with a generator. The brake booster may be able to be situated as a compact unit in a braking system of the vehicle. The brake booster may also be developed as a non-separately developed subunit of the braking system.

The brake booster has a master brake cylinder 10 having a first primary piston chamber 12, a first volume of the first primary piston chamber 12 being able to be varied using an adjustable first primary piston component 14. A braking force transmission component 16 of the brake booster, such as an output rod, is able to be situated in such a way (directly or indirectly) on a braking operation element (not shown) that at least one driver braking force is able to be transmitted via braking force transmission component 16 to first adjustable primary piston component 14 contacted by braking force transmission component 16. The brake operating element may be a brake pedal, for instance. However, the practicability of the brake operating element or the braking force transmission component 16 is not limited to the exemplary embodiments enumerated here.

Master brake cylinder 10 also has a second primary piston chamber 18, whose second volume is able to be varied using an adjustable second primary piston component 20. The brake booster also has a booster force transmission component 22, on which a (non-sketched) actuator device is able to be positioned (directly or indirectly) in such a way, that a booster force provided by the actuator device is able to be transmitted at least partially via booster force transmission component 22 to second adjustable primary piston component 20 contacted by booster force transmission component 22. The actuator device may, for instance, be a motor and/or a hydraulic system of a braking force booster.

First primary piston component 14 and/or second primary piston component 20 may be developed as a rod piston component. We should point out, however, that the ability to develop a primary piston component 14 and 20 is not limited to a rod piston. Similarly, first primary piston component 14 and/or second primary piston component 20 may each be constructed of a plurality of subcomponents. The shape of first primary piston component 14 and of second primary piston component 20 as well are established using great freedom of configuration.

In addition, braking force transmission component 16, that is present in its force-free initial position, is distanced from first primary piston component 14 by a first free play L1 unequal to zero and/or booster force transmission component 22, that is present in its force-free initial position, is distanced by a second free play L2 unequal to zero from second primary piston component 20. By force-free initial position of braking force transmission component 16 one may, for example, understand a position of it in which braking force transmission component 16 is present if no driver braking force is being transmitted to it. Correspondingly, by a force-free initial position of booster force transmission component 22 one may understand a position of it in which booster force transmission component 22 is present at a booster force equal to zero or at a deactivation of the actuator device. In a particular manner, one may understand by force-free initial positions of force transmission components 16 and 22, positions in which force transmission components 16 and 22 are present provided no driver braking force is being exerted on the brake operating element, and no booster force is being provided using the actuator device.

The development of first free play L1 unequal to zero is connected with the advantage that, in spite of a driver braking force unequal to zero, which effects an adjustment of braking force transmission component 16, the braking of the driver braking force into master brake cylinder 10 is prevented up to a certain minimum driver braking force. Similarly, using second free play L2 unequal to zero has the effect that, in spite of a booster force unequal to zero, which triggers an adjustment of booster force transmission component 22, the braking of the booster force into master brake cylinder 10 is prevented up to the exceeding of the minimum booster force. This may be utilized for a plurality of advantageous utilization possibilities, which will be described more exactly below.

For instance, braking force transmission component 16 in its force-free initial position may be present distanced by a first free play L1 unequal to zero from first primary piston component 14, which is greater than a distance (equal to zero or unequal to zero) between booster force transmission component 22 in its force-free initial position and second primary piston component 20. As will be stated more accurately below, this enables building up an admission pressure in first primary piston chamber 12, even before a direct braking by the driver into master brake cylinder 10.

Alternatively, booster force transmission component 22 in its force-free initial position may be present distanced by a second free play L2 unequal to zero from second primary piston component 20, which is greater than a distance (equal to zero or unequal to zero) between braking force transmission component 16 in its force-free initial position and the first primary piston component 14. A large second free play L2 is connected with the advantage that, in spite of a booster force unequal to zero and a booster force transmission component 22 adjusted at least slightly from its force-free initial position, no additional braking pressure is built up by adjusting second primary piston component 20. The braking effect dropping out because of the remaining of second primary piston component 20 in a position having a maximum second volume may be utilized for using a generator, without a vehicle deceleration specified by the driver being exceeded. Consequently, a comparatively greater second free play L2 may be used for a more rapid charging of a vehicle battery.

In the development shown schematically in FIG. 1, first primary piston component 14 bounds first primary piston chamber 12 with a first boundary surface F1. Correspondingly, second primary piston chamber 18 is bounded by a second boundary surface F2 of second primary piston component 14. It should be pointed out that first primary piston component 14 is still able to be adjusted into master brake cylinder 10, even when an actuator device is present in a deactivated/functionally impaired state. The advantageous, separate development of master brake cylinder 10 and the use of two primary piston components 14 and 20 is additionally connected with the advantage that, in response to a functional impairment of the actuator device/braking force booster device using an operations of the braking operating element, only first primary piston component 14 is to be moved, while second primary piston component 20 remains in a certain position in spite of the operation of the braking operation element by the driver. The driver consequently does not have to brake using the overall braking surface equal to the sum of boundary surfaces F1+F2, but only using a reduced braking surface equal to first boundary surface F1, into first primary piston chamber 12 of master brake cylinder 10. In this way, there comes about, using a changed hydraulic step-up ratio, a greater braking action, in spite of the driver's braking force remaining the same. One may rewrite this to say that, based on the reduced braking surface equal to first boundary surface F1, the driver braking force effects a larger pressure build-up in master brake cylinder 10. Thus, the functional impairment of the actuator device/braking force booster device, based on the advantageous development of master brake cylinder 10 and the use of two primary piston components 14 and 20, is able to be compensated for in a simple manner, at least partially, via a raised braking force-braking pressure step-up ratio. In addition, based on the advantageous subdivision into the at least two primary piston chambers 12 and 18 that are demarcated from each other, the braking volume may be reduced in response to a functional impairment of braking force booster device 12. This improves in addition the compensatability of a functional impairment/of a failure of the braking force booster device.

In one advantageous refinement, master brake cylinder 10 may also have a secondary piston chamber 24 and a secondary piston 26 that is able to be adjusted between first primary piston chamber 12 and the secondary piston chamber 24. Secondary piston 26 may be developed particularly as a floating piston. The advantages of a tandem master brake cylinder are thus also able to be used on the development form of the brake booster.

First primary piston chamber 12, second primary piston chamber 18 and/or secondary piston chamber 24 may be connected via at least one brake fluid exchange opening 28, such as a snifting bore, to a brake fluid reservoir 30/brake fluid container. In addition, between first primary piston chamber 12 and second primary piston chamber 18 at least one partial separating wall 32 may have been developed, which separates the first volume of first primary piston chamber 12 from the second volume of second primary piston chamber 18. This simplifies the equipping of master brake cylinder 10 with two primary pistons 14 and 20, which are adjustable at least partially into primary piston chambers 12 and 18 associated with them through at least one outer opening 34, 36. For example, each of primary piston components 14 and 20 may have its own opening 34 and 36 assigned to it. Using at least one sealing element, such as a sealing ring, the trickling out of fluid may be prevented in spite of an adjustment of the respective primary piston component 14 and 20 from the respective opening 35 and 36.

In one advantageous refinement, the brake booster has a fluid exchange device 38, via which a fluid is exchangeable between the first primary piston chamber 12 and the second primary piston chamber 18, when fluid exchange device 38 is present in a first operating mode. In addition, fluid exchange device 38 may be controllable/switchable from the first operating mode at least into a second operating mode, a fluid exchange being prevented between first primary piston chamber 12 and second primary piston chamber 18 using fluid exchange device 38 when fluid exchange device 38 is present in the second operating mode. Fluid exchange device 38 may, for example, be a brake circuit 38 having at least one wheel brake cylinder 40 to which primary piston chambers 12 and 18 are connected. For switching/controlling first brake circuit 38 between the at least two operating modes, a component (not sketched) of first brake circuit 38 may be used. (In an optional manner, secondary piston chamber 24 may also be connected to a second brake circuit 42 having at least one wheel brake cylinder 44.) As fluid exchange device 38 one may, however, also use a valve developed in partial separating wall 32. One particularly advantageous development of the at least one wheel brake cylinder 40 and 44/equipment of the at least one brake circuit 38 and 42 will be further discussed below.

In one additional refinement, the brake booster may have a booster body 46 which is situated between the actuator device and booster force transmission component 22 in such a way that the booster force is able to be transmitted to booster force transmission component 22 via booster body 46. In addition, booster body 46 is able to contact braking force transmission component 16 in at least one position. Thus, at least one part of the booster force may also be transmitted via braking force transmission component 16 to first primary piston component 14 for the force-connected support of the driver during braking into master brake cylinder 10. This ensures an advantageous brake operating comfort for the driver.

Figure 2A:
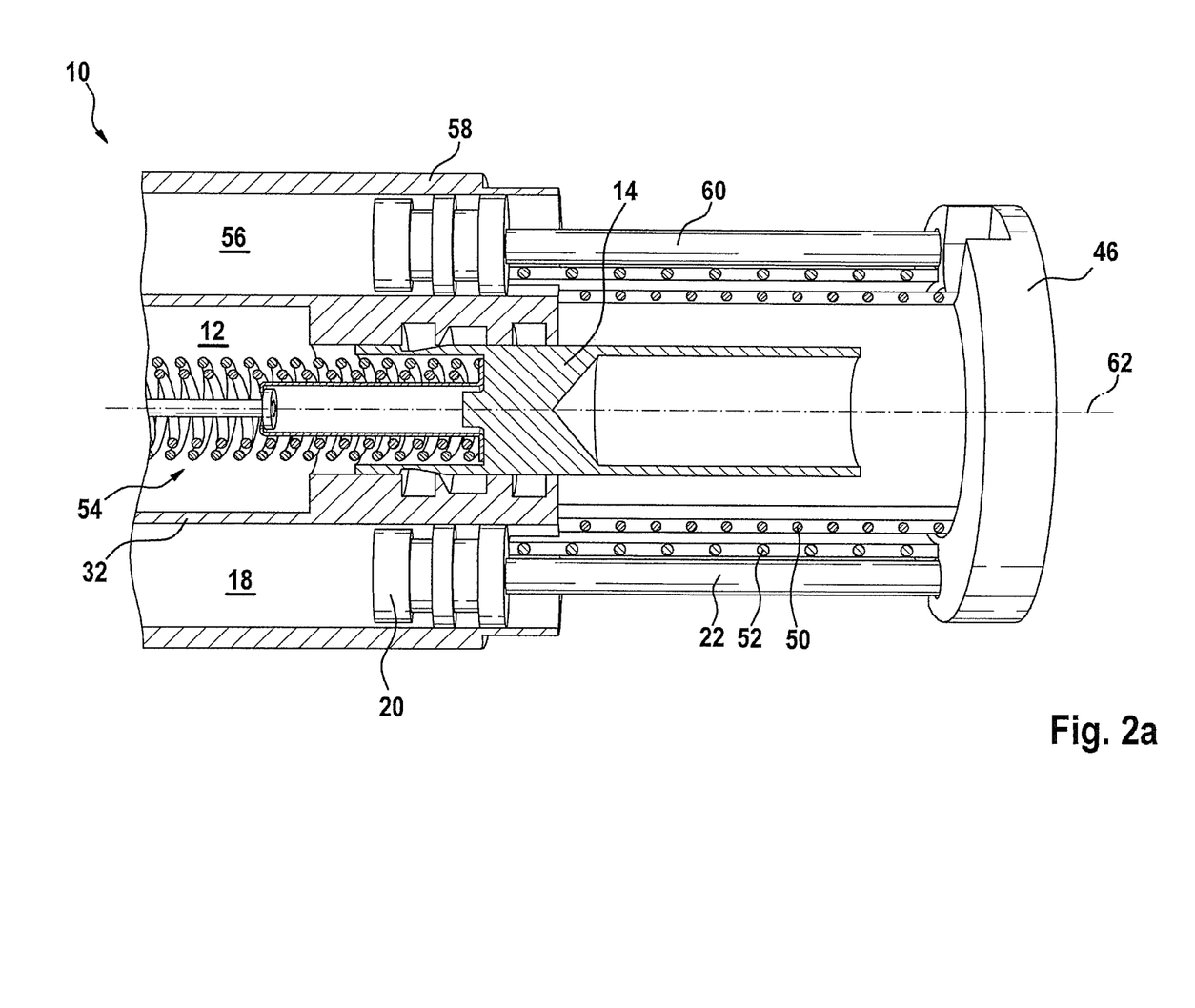
FIGS. 2a and 2b show schematic partial representations of a second specific embodiment of the brake booster.
Figure 2B:
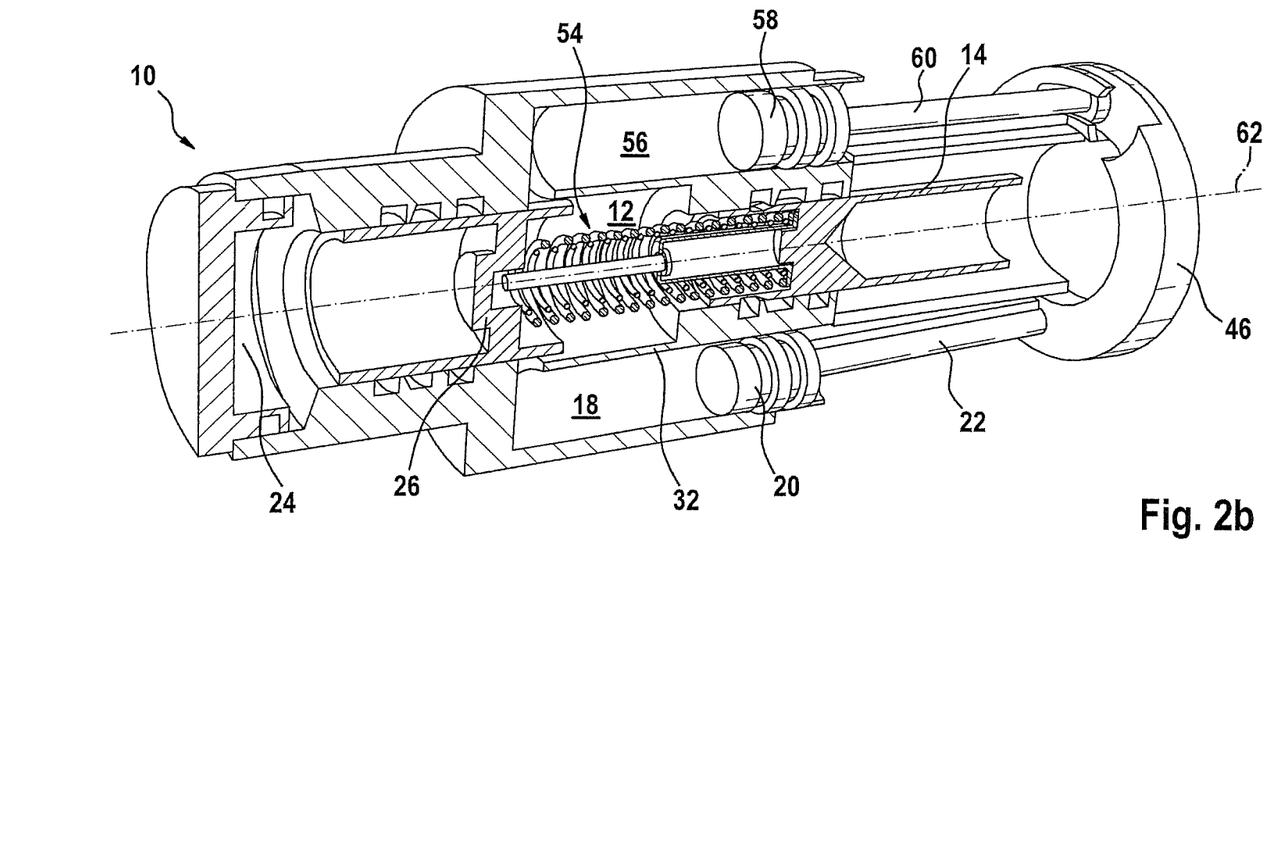

FIGS. 2a and 2b show schematic partial illustrations of a second specific embodiment of the brake booster.

The specific embodiment shown schematically in FIGS. 2a and 2b has the components already described above. We have omitted a more accurate drawing in of the first free play and the second free play in FIGS. 2a and 2b. FIGS. 2a and 2b also show a first return spring 50 that cooperates with braking force transmission component 16, a second return spring 52 cooperating with booster body 46 and a spring system 54 situated in first primary piston chamber 12, via which first primary piston component 14 is supported on second piston component 26.

In addition, master brake cylinder 10, in the specific embodiment shown, has still a third primary piston chamber 56, whose third volume is variable using an adjustable third primary piston component 58. Via an additional booster force transmission component 60, at least one part of the booster force may also be transmitted by booster body 46 to third primary piston component 58. Consequently, the advantage of the varying braking surface, which has been mentioned above, is able to be increased optionally using a refinement of master brake cylinder 10. Second primary piston chamber 18 and third primary piston chamber 56 may be developed particularly symmetrically to each other with respect to a center longitudinal axis 62 of first primary piston chamber 12. However, the refinement of master brake cylinder 10 described here is optional.

The brake boosters described in the above paragraphs may, in one advantageous refinement, also have an actuator-control device and/or a generator-control device. The cooperation of the brake boosters with the actuator-control device is advantageous, provided at least braking force transmission component 16, present in its force-free initial position, distanced by the first free play unequal to zero from first primary piston component 14, which is able to be closed only as of a minimum driver braking force. In particular, the actuator-control device is of advantage if braking force transmission component 16 present in its force-free initial position may be distanced by the first free play, unequal to zero, from first primary piston component 14, which is greater than a distance between the booster force transmission component 22 present in its force-free initial position and the second primary piston component 20. The actuator-control device may be configured so that, using the actuator-control device, the actuator device is able to be actuated in such a way that for a driver braking force below the minimum driver braking force, a specified setpoint booster force is able to be exerted using the actuated actuator device on second primary piston component 20 in such a way that the second volume of second primary piston chamber 18 is reducible using the adjusted second primary piston chamber 18, and a fluid transfer from second primary piston chamber 18 into the at least one wheel brake cylinder is able to be triggered for building up an admission pressure at least in the at least one wheel brake cylinder.

The actuator-control device is advantageously also configured to specify the setpoint booster force while taking into account at least one state of a braking system component and/or a traffic situation. In particular, the setpoint booster force may be specifiable, using the actuator-control device, in such a way that an air gap between at least one residual torque-free brake caliper and a brake disk is able to be closed using the built-up admission pressure. The brake boosters described above may particularly be a subunit of a brake system which has at least one residual torque-free brake caliper. Since the brake boosters discussed above are able to be operated in a simple way so that, even before the direct braking, an air gap between the at least one residual torque-free brake caliper and a brake disk is able to be closed, such a brake system ensures the advantages of advantageous braking comfort for the driver, at a reduced fuel consumption and low emission of pollutants.

The cooperation of the brake boosters, described above, with a generator-control device is advantageous, provided at least booster force transmission component 22, present in its force-free initial position, is present distanced by the first free play unequal to zero from first primary piston component 20, which is able to be closed only as of a minimum driver braking force. In particular, the actuator-control device is of advantage if braking force transmission component 22, present in its force-free initial position, is distanced by the second free play, unequal to zero, from second primary piston component 20, which is greater than a distance between the booster force transmission component 16 present in its force-free initial position and first primary piston component 14. The generator-control device is advantageously configured at a booster force less than the minimum booster force to actuate a generator in such a way that, using the generator, a generator brake torque unequal to zero is able to be exerted.

The actuator-control device and/or the generator-control device may, in particular, be configured to carry out the functions explained with the aid of the methods described below. With respect to the functioning of the actuator-control device and the generator-control device, which may especially be integrated into a common electronics system, and the advantages coming about thereby, we therefore refer to the following methods.

Figure 3:
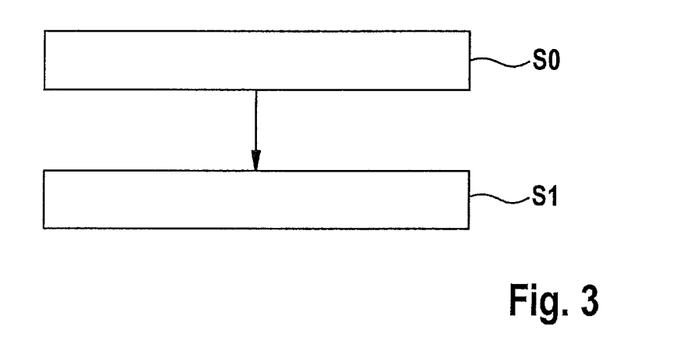
FIG. 3 shows a flow chart for explaining a first specific embodiment of the method for operating a brake booster of a vehicle.

FIG. 3 shows a flow chart for explaining a first specific embodiment of the method for operating a brake booster of a vehicle.

The method reproduced with the aid of FIG. 3 may be carried out using a brake booster having a master brake cylinder that has a first primary piston chamber and a second primary piston chamber, a braking force transmission component by which at least one driver braking force is transmitted to a first adjustable primary piston chamber contacted by the braking force transmission component in such a way, that a first volume of the first primary piston chamber is varied using the adjusted first primary piston component, and a booster force transmission component, with which a booster force, provided by an actuator device, is transmitted, at least partially, in such a way to a second adjustable primary piston component contacted by the booster force transmission component, that a second volume of the second primary piston chamber is varied using the adjusted second primary piston. In addition, at least the braking force transmission component in its force-free initial position is present distanced by a first free play, unequal to zero, from the first primary piston component, which is only closed as of a minimum driver braking force. The method is also advantageous, provided the braking force transmission component is present in its force-free initial position distanced by the first free play, unequal to zero, from the first primary piston component, which is greater than a distance between the booster force transmission component 22 present in its force-free initial position and the second primary piston component. The method described here is able to be executed using the brake booster described above, for example. The feasibility of the method, however, is not limited to the use of such a brake booster.

The method has at least one method step S1, in which an admission pressure at least of at least one wheel brake cylinder at/in spite of a driver braking force is built up below the minimum driver braking force. This takes place by exerting a specified setpoint booster force using the actuator device. The setpoint booster force, transmitted at least partially to the second primary piston component, effects a reduction in the second volume of the second primary piston chamber, using the adjusted second primary piston component, and triggers a fluid transfer from the second primary piston chamber into the at least one wheel brake cylinder. Consequently, even at the beginning of a direct braking of the driver into the master brake cylinder, an advantageous admission pressure is present in the at least one wheel brake cylinder.

The method also optionally has a method step S0, in which the setpoint booster force is specified while taking into account at least one state of a braking system component and/or a traffic situation.

For example, after detecting a traffic situation in which rapid braking of the vehicle seems to be advantageous, even before a direct braking of the driver into the master brake cylinder, an advantageous admission pressure is built up. Alternatively or in supplement, at least one state of a braking system component, such as a functional impairment of a braking system component, is taken into account when establishing the setpoint booster force.

In one advantageous specific embodiment of the method, the setpoint booster force is specified or established so (fixedly/constantly), that an air gap between at least one brake caliper and a brake disk is closed using the built-up admission pressure even before a direct braking of the driver into the master brake cylinder. A residual torque-free brake caliper has an increased air gap. One may also rewrite this to say that, in the case of a residual torque-free brake caliper, no grinding of the pads of the brake caliper occurs on the brake disk. By contrast, in the case of another type of brake caliper/non-residual torque-free brake caliper, even during travel during non-operation of the brake operating element, grinding of the pads on the brake disk occurs, which is able to effect a braking of the vehicle that is undesired, as a rule. This undesired braking based on the grinding of the pads of a non-residual torque-free brake caliper must therefore be compensated for, as a rule, by an additional acceleration of the vehicle, whereby conventionally, fuel consumption and the emission of pollutants during the travel are increased while the brake operating element is not being operated.

By contrast, the increased air gap of the residual torque-free brake caliper is connected with the advantage that no undesired braking takes place during the non-operation of the brake operating element, and thus travel of the vehicle is possible even at slight fuel consumption and low emission of pollutants. However, because of the air gap, a volume take-up of the associated wheel brake cylinder, which is necessary before the braking torque is effected, is increased. Therefore, the driver of a vehicle having residual torque-free brake calipers, conventionally often gets the impression that that he has a "long brake pedal", which is sometimes perceived as unsporty or unpleasant. Therefore, many drivers do not avail themselves of equipping their vehicle with residual torque-free brake calipers, in spite of the advantages connected to these with respect to lower fuel consumption and low emission of pollutants.

The build-up of the admission pressure effected by method step S1 has the effect of prefilling the wheel brake cylinder, however, whereby even before a direct braking of the driver into the master brake cylinder, the air gap may be overcome. The driver of a vehicle whose brake system is operated using the method reproduced here, thus gets a normal braking feel/pedal feel, even when being equipped with residual torque-free brake calipers. Consequently, the method described here combines the advantages of an advantageous brake feel/pedal feel with reduced fuel consumption and slight emission of pollutants.

Increased air gaps, in particular, are able to be compensated for in this instance, using the method described. Because of the prefilling effected, the driver has, in any case, a shorter brake operating path/pedal path. In addition, the application of the method described here is able to be combined with the improved mechanical fallback level, that was described above, for instance, in response to a functional impairment of at least one brake system component, such as particularly the actuator device utilized as braking force booster.

Figure 4:
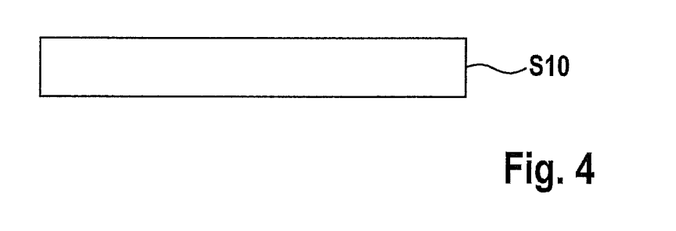
FIG. 4 shows a flow chart for explaining a first second specific embodiment of the method for operating a brake booster of a vehicle.

FIG. 4 shows a flow chart to show a second exemplary embodiment of the method for operating a brake booster of a vehicle.

The method may be carried out using a brake booster having a master brake cylinder that has a first primary piston chamber and a second primary piston chamber, a braking force transmission component by which at least one driver braking force is transmitted to a first adjustable primary piston chamber contacted by the braking force transmission component in such a way, that a first volume of the first primary piston chamber is varied using the adjusted first primary piston component, and a booster force transmission component, with which a booster force, provided by an actuator device, is transmitted, at least partially, in such a way to a second adjustable primary piston component contacted by the booster force transmission component, that a second volume of the second primary piston chamber is varied using the adjusted second primary piston component. At least the booster force transmission component present in its force-free initial position is distanced by a second free play, unequal to zero, from the second primary piston component, which is closed only as of a minimum booster force. In addition, the method is of advantage if the booster force transmission component, present in its force-free initial position, is distanced by the second free play, unequal to zero, from the second primary piston component, which is greater than a distance between the braking force transmission component, present in its force-free initial position, and the second primary piston component.

The method described here is able to be executed using the brake booster described above, for example. The feasibility of the method, however, is not limited to the use of such a brake booster.

The method has a method step S10, in which, at least in response to a booster force below the minimum booster force, a generator is activated to exert a generator braking torque unequal to zero. Consequently, the second free play between the booster force transmission component and the second primary piston component is utilized for reducing, particularly preventing, a braking effect of the actuator device, and thus to use a generator for the more rapid charging of a vehicle battery. At the same time, in the fallback level described above, the advantage is ensured that the driver is able, rapidly and reliably, to brake directly into the master brake cylinder, and thus to effect a standstill of the vehicle.

The advantageous technology, described in the upper paragraphs, makes possible coupling an operation of the actuator device and operating the brake operating element by the driver. At the same time it is possible to decouple the driver from the brake system, within a restricted scope.

Likewise, one may advantageously carry out a blending of the electrical braking of a generator and the hydraulic braking of a brake system equipped with/operated by the advantageous technology. The blending may be carried out in particular so that the driver notices no difference between electrical braking and hydraulic braking. At the same time, because of the available setting of a primary braking volume at least between an overall volume of the two primary piston chambers or only the first primary piston chamber, or the braking surface, an improvement of the fallback level may be achieved.

What is claimed is:

1. A brake booster for a vehicle, comprising:
a master brake cylinder having a first primary piston chamber, a first volume of which is variable using an adjustable first primary piston component;
a braking force transmission component, wherein at least one driver braking force is transmittable to the adjustable first primary piston component contacted by the braking force transmission component via the braking force transmission component; and
an adjustable second primary piston component, wherein the master brake cylinder has a second primary piston chamber, a second volume of which is variable using the adjustable second primary piston component; and
a booster force transmission component, wherein a booster force is transmittable at least partially via the booster force transmission component to the adjustable second primary piston component contacted by the booster force transmission component;
wherein the braking force transmission component, present in its force-free initial position, is distanced by a first free play, unequal to zero, from the first primary piston component, and the booster force transmission component, present in its force-free initial position, is distanced by a second free play, unequal to zero, from the second primary piston component.

2. The brake booster of claim 1, wherein the braking force transmission component, present in its force-free initial position, is distanced by the first free play, unequal to zero, from the first primary piston component, which is greater than a distance between the booster force transmission component, present in its force-free initial position, and the second primary piston component.

3. The brake booster of claim 1, wherein the booster force transmission component, present in its force-free initial position, is distanced by the second free play, unequal to zero, from the second primary piston component, which is greater than a distance between the braking force transmission component, present in its force-free initial position, and the first primary piston component.

4. The brake booster of claim 1, further comprising:
a fluid exchange device, via which, when the fluid exchange device is present in a first operating mode, a fluid is exchangeable between the first primary piston chamber and the second primary piston chamber, and via which, when the fluid exchange device is present in a second operating mode, a fluid exchange between the first primary piston chamber and the second primary piston chamber is prevented.

5. The brake booster of claim 1, wherein the master brake cylinder includes a secondary piston chamber and a secondary piston that is adjustable between the first primary piston chamber and the secondary piston chamber.

6. The brake booster of claim 1, wherein at least the braking force transmission component, present in its force-free initial position, is at a distance of the first free play, unequal to zero, from the first primary piston component, and the brake booster having an actuator-control device, wherein at a driver braking force less than a minimum driver braking force threshold, a specified setpoint booster force is exertable, so that on the second primary piston component, that the second volume of the second primary piston chamber is reducible using the adjusted second primary piston component, and a fluid transfer from the second primary piston chamber into at least one wheel brake cylinder is triggerable to build up an admission pressure in the at least one wheel brake cylinder.

7. The brake booster of claim 6, wherein the actuator-control device is configured to specify the setpoint booster force while taking into account at least one state of a braking system component and/or a traffic situation.

8. The brake booster of claim 1, wherein at least the booster force transmission component, present in its force-free initial position, is distanced from the second primary piston component by the second free play, unequal to zero, which is close-able only as of a minimum booster force, and wherein there is a generator control device, which, at least at a booster force less than the minimum booster force, which is configured to actuate a generator so that, using the generator, a generator braking torque unequal to zero is exertable.

9. A brake system for a vehicle, comprising:
a brake booster, including:
a master brake cylinder having a first primary piston chamber, a first volume of which is variable using an adjustable first primary piston component;
a braking force transmission component, wherein at least one driver braking force is transmittable to the adjustable first primary piston component contacted by the braking force transmission component via the braking force transmission component; and
an adjustable second primary piston component, wherein the master brake cylinder has a second primary piston chamber, a second volume of which is variable using the adjustable second primary piston component; and
a booster force transmission component, wherein a booster force is transmittable at least partially via the booster force transmission component to the adjustable second primary piston component contacted by the booster force transmission component;

wherein the braking force transmission component, present in its force-free initial position, is distanced by a first free play, unequal to zero, from the first primary piston component, and the booster force transmission component, present in its force-free initial position, is distanced by a second free play, unequal to zero, from the second primary piston component.

10. A method for operating a brake booster of a vehicle having a master brake cylinder having a first primary piston chamber and a second primary piston chamber, the method comprising:

transmitting, using a braking force transmission component, at least one driver braking force to an adjustable first primary piston component contacted by the braking force transmission component, so that a first volume of the first primary piston chamber is varied using the adjusted first primary piston component;

transmitting, using a booster force transmission component, a booster force at least partially to an adjustable second primary piston component contacted by the booster force transmission component, so that a second volume of the second primary piston chamber is varied using the adjusted second primary piston component, the braking force transmission component present in its force-free initial position being distanced by a first free play, unequal to zero, from the first primary piston component, which is closed only as of a minimum driver braking force threshold, and the booster force transmission component present in its force-free initial position being distanced by a second free play, unequal to zero, from the second primary piston component; and building up an admission pressure in at least one wheel brake cylinder at a driver braking force below the minimum driver braking force threshold by exerting a specified setpoint booster force for triggering a reduction of the second volume of the second primary piston chamber using the adjusted second primary piston component and of a fluid transfer from the second primary piston chamber into the at least one wheel brake cylinder.

11. The method of claim 10, wherein the setpoint booster force is specified while taking into account at least one state of a brake system component and/or and a traffic situation.

12. A method for operating a brake booster of a vehicle having a master brake cylinder having a first primary piston chamber and a second primary piston chamber, the method comprising:

transmitting, using a braking force transmission component, at least one driver braking force to an adjustable first primary piston component contacted by the braking force transmission component, so that a first volume of the first primary piston chamber is varied using the adjusted first primary piston component;

transmitting, using a booster force transmission component, a booster force at least partially to an adjustable second primary piston component contacted by the booster force transmission component, so that a second volume of the second primary piston chamber is varied using the adjusted second primary piston component, the braking force transmission component present in its force-free initial position being distanced by a first free play, unequal to zero, from the first primary piston component, and the booster force transmission component present in its force-free initial position being distanced by a second free play, unequal to zero, from the second primary piston component, which is closed only as of a minimum booster force; and activating a generator for exerting a generator braking torque, unequal to zero, at least at a booster force below the minimum booster force.

* * * * *